United States Patent
Porte et al.

(10) Patent No.: US 9,067,686 B2
(45) Date of Patent: Jun. 30, 2015

(54) NACELLE COMPRISING AN AIR ENTRANCE IN A CAP

(75) Inventors: Alain Porte, Colomiers (FR); Matthieu Fargues, Montauban (FR); Thomas Stevens, Tournefeuille (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 1045 days.

(21) Appl. No.: 13/155,844

(22) Filed: Jun. 8, 2011

(65) Prior Publication Data
US 2011/0303302 A1 Dec. 15, 2011

(30) Foreign Application Priority Data
Jun. 9, 2010 (FR) ...................................... 10 54535

(51) Int. Cl.
*B64D 27/00* (2006.01)
*B64D 29/02* (2006.01)
*B64C 7/02* (2006.01)

(52) U.S. Cl.
CPC .. *B64D 29/02* (2013.01); *B64C 7/02* (2013.01)

(58) Field of Classification Search
CPC .............. F23R 3/60; F23R 3/283; F02C 7/20; B64D 2027/262; B64D 2027/266; B64D 27/26; B64D 29/00; B64D 29/02; B64D 29/06
USPC ................ 60/796–798; 244/54; 248/554–557
See application file for complete search history.

(56) References Cited

U.S. PATENT DOCUMENTS

| | | | | |
|---|---|---|---|---|
| 4,683,717 A | * | 8/1987 | Naud | ............................ 60/226.1 |
| 5,490,644 A | * | 2/1996 | Koncsek et al. | ............ 244/53 B |
| 5,524,847 A | * | 6/1996 | Brodell et al. | .................. 244/54 |
| 5,704,207 A | | 1/1998 | Jensen et al. | |
| 5,775,638 A | | 7/1998 | Duesler | |
| 6,179,249 B1 | * | 1/2001 | Canadas | ..................... 244/53 R |
| 7,971,826 B2 | * | 7/2011 | Journade et al. | ................ 244/54 |
| 8,220,738 B2 | * | 7/2012 | Calder et al. | ................ 244/53 R |
| 2006/0060697 A1 | * | 3/2006 | Beaufort | ..................... 244/53 B |
| 2009/0272842 A1 | * | 11/2009 | Bulin | ............................... 244/54 |
| 2010/0127116 A1 | * | 5/2010 | Calder et al. | .................... 244/54 |
| 2010/0176250 A1 | | 7/2010 | Porte | |
| 2012/0097261 A1 | * | 4/2012 | Porte et al. | .................... 137/15.1 |

FOREIGN PATENT DOCUMENTS

| | | |
|---|---|---|
| FR | 2 861 364 A1 | 4/2005 |
| FR | 2 902 406 A1 | 12/2007 |
| GB | 2 302 371 A | 1/1997 |

OTHER PUBLICATIONS

French Search Report, dated Feb. 1, 2011, from corresponding French application.

* cited by examiner

*Primary Examiner* — Craig Kim
(74) *Attorney, Agent, or Firm* — Young & Thompson

(57) ABSTRACT

An aircraft nacelle includes an outside wall (22), at least one air system with at least one air intake (30), whereby the nacelle is connected by connecting element to a mast that is itself connected to the aircraft, with the connecting element allowing a relative movement between the nacelle and the mast in the longitudinal direction of the nacelle, whereby at the front of the junction zone with the nacelle, the mast includes an aerodynamic surface that is called a fairing (24) that covers and exposes a zone of the outside wall called an overlapping zone (28) based on the position of the nacelle (10) relative to the mast, characterized in that an air intake (30) for an air system is arranged at the overlapping zone (28).

14 Claims, 3 Drawing Sheets

NACELLE COMPRISING AN AIR ENTRANCE IN A CAP

BACKGROUND OF THE INVENTION

1. Field of the Invention

Figure 1:
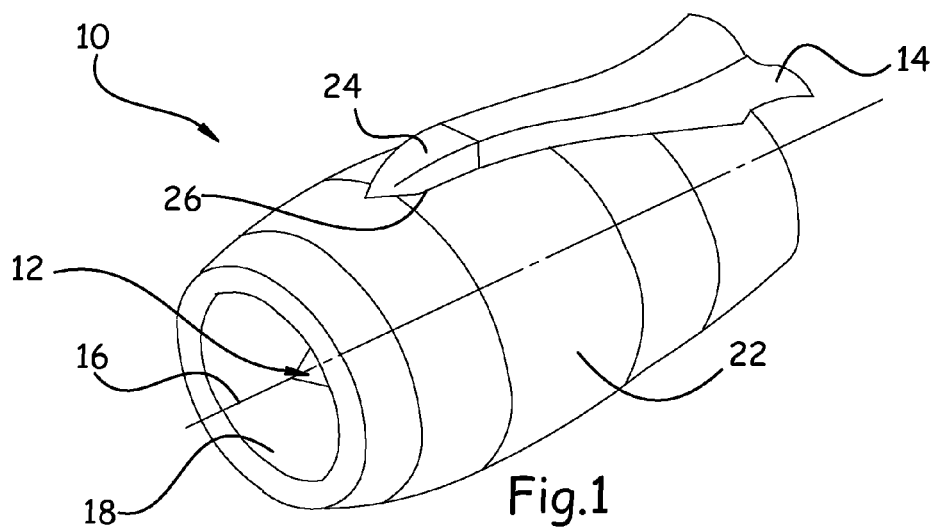

This invention relates to a nacelle that incorporates an air intake at the front of the junction of said nacelle and the mast that supports it and that is called a fairing.

2. Description of the Related Art

An aircraft propulsion system comprises a nacelle in which a power plant, connected by means of a mast to the rest of the aircraft, is arranged in an essentially concentric manner.

The nacelle comprises an inside wall that delimits a pipe with an air intake at the front, a first portion of the incoming air stream, called the primary stream, that passes through the power plant to take part in the combustion process, with the second portion of the air stream, called the secondary stream, being entrained by a fan and flowing into an annular pipe that is delimited by the inside wall of the nacelle and the outside wall of the power plant.

The nacelle also comprises an outside wall with an essentially circular cross-section, which extends from the air intake to the aft exhaust, consisting of the juxtaposition of several elements.

At the front of the junction zone with the nacelle, the mast comprises an aerodynamic surface that is called a fairing and that has as its function to limit the drag at the junction of the nacelle and the mast. Under the aerodynamic loads during flight, the nacelle moves slightly relative to the mast and therefore relative to the fairing, in particular along the longitudinal axis of the nacelle.

The nacelle comprises at least one air system, in particular for ensuring the reheating, the cooling or the ventilation, comprising a circuit that extends from at least one air intake to at least one air exhaust by passing through at least one exchanger or any other device that requires air or that operates with air.

An air system necessarily induces a parasitic drag that originates, for example, from the surface defects linked to the implantation of the intake or the exhaust at the surface that is in contact with the outside air stream or because of the difference between the flows collected and expelled in said air stream.

However, to meet the expectations of the clients, aircraft manufacturers are seeking to improve the aerodynamics of their equipment in order to reduce their operating costs that are strongly linked to the fuel consumption.

This application relates more particularly to an air intake that is also called a scoop.

To limit its impact on aerodynamics, the air intake is to be blocked when there is no need for air. Consequently, certain air intakes comprise a flap that can occupy a first so-called closed position in which the flap blocks the air intake and comes into the extension of the aerodynamic surfaces that surround the air intake, and a second so-called open position in which the flap releases the air intake and allows the passage of air. An actuator, for example a jack, activated by aircraft control means, is used to maneuver the flap.

The flap and the actuator increase the on-board weight and require specific maintenance, which impacts the operating costs.

SUMMARY OF THE INVENTION

This invention proposes an open air intake during certain flight phases whose closing mechanism does not increase the on-board weight and does not require specific maintenance.

For this purpose, the invention has as its object an aircraft nacelle that comprises an outside wall, at least one air system with at least one air intake, whereby said nacelle is connected by connecting means to a mast that is itself connected to the aircraft, whereby said connecting means allow a relative movement between said nacelle and said mast in the longitudinal direction of the nacelle, whereby at the front of the junction zone with the nacelle, said mast comprises an aerodynamic surface that is called a fairing that covers and exposes a zone of the outside wall called an overlapping zone based on the position of the nacelle relative to the mast, characterized in that an air intake for an air system is arranged at said overlapping zone.

This solution has the advantage of benefitting from a relative movement between two parts for generating the opening and closing of an air intake and thus contributing to limiting its impact on the aerodynamics of the aircraft.

Taking into account that this relative movement between the two parts exists, this solution avoids the use of a specific flap and a specific actuator that may increase the on-board weight and may require specific maintenance.

BRIEF DESCRIPTION OF THE DRAWING FIGURES

Figure 2A:
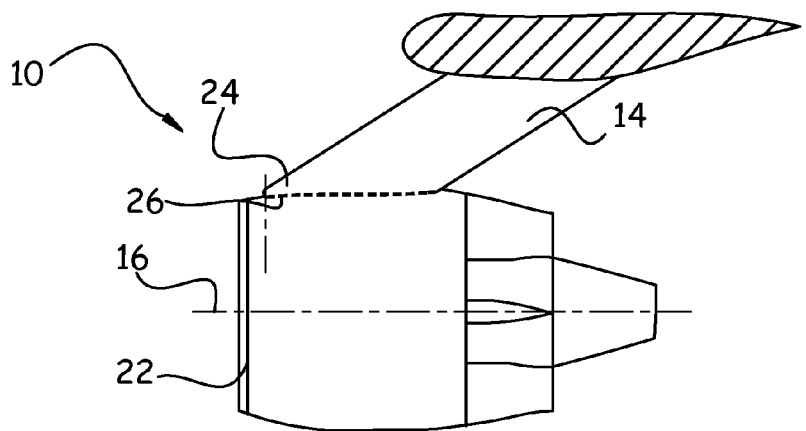
Figure 2B:
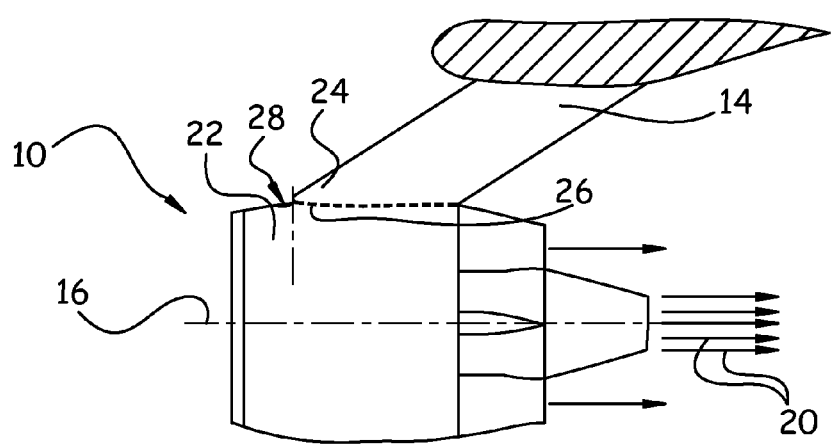
Figure 3:
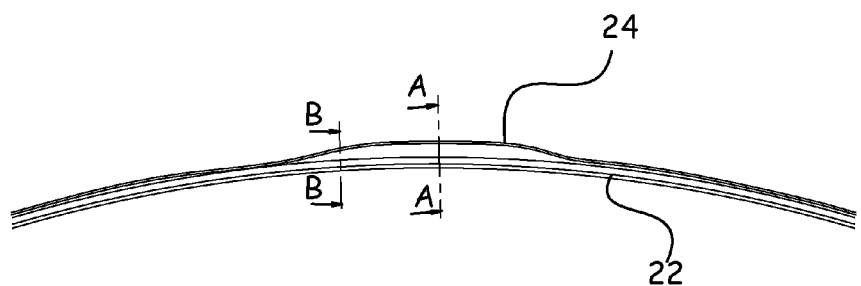
Figure 4A:
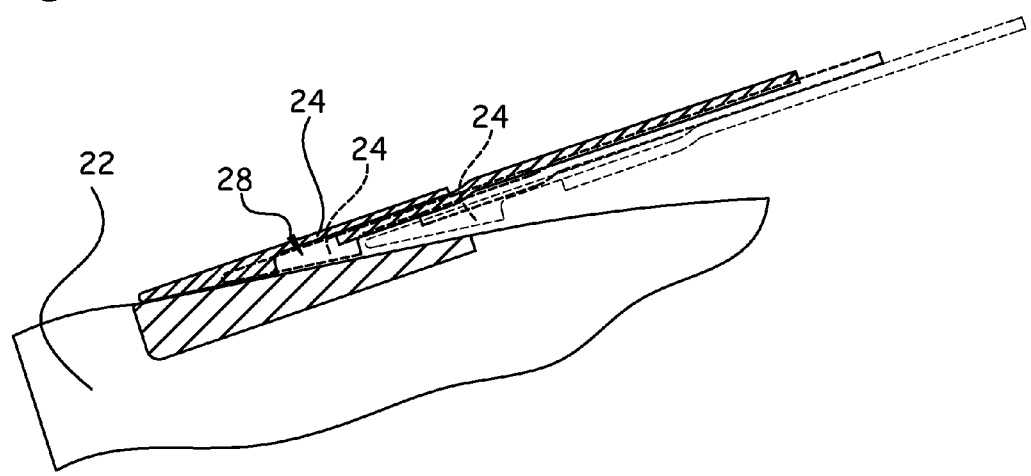
Figure 4B:
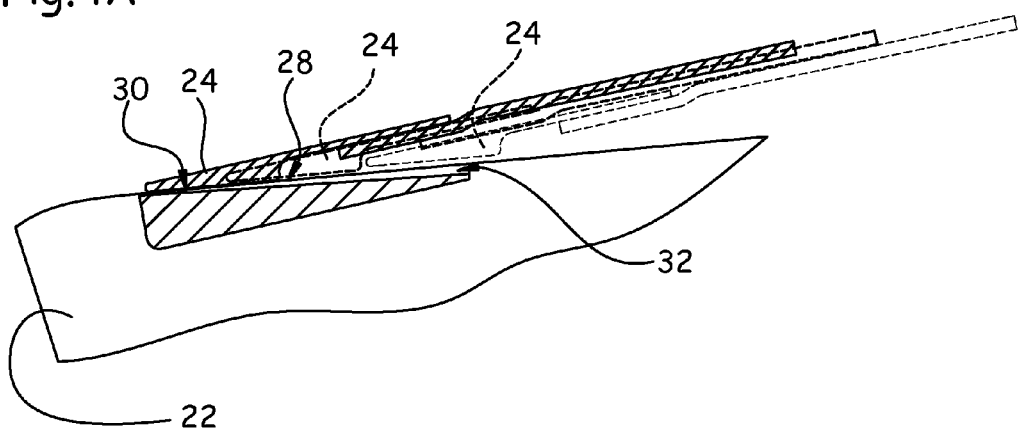
Figure 5:
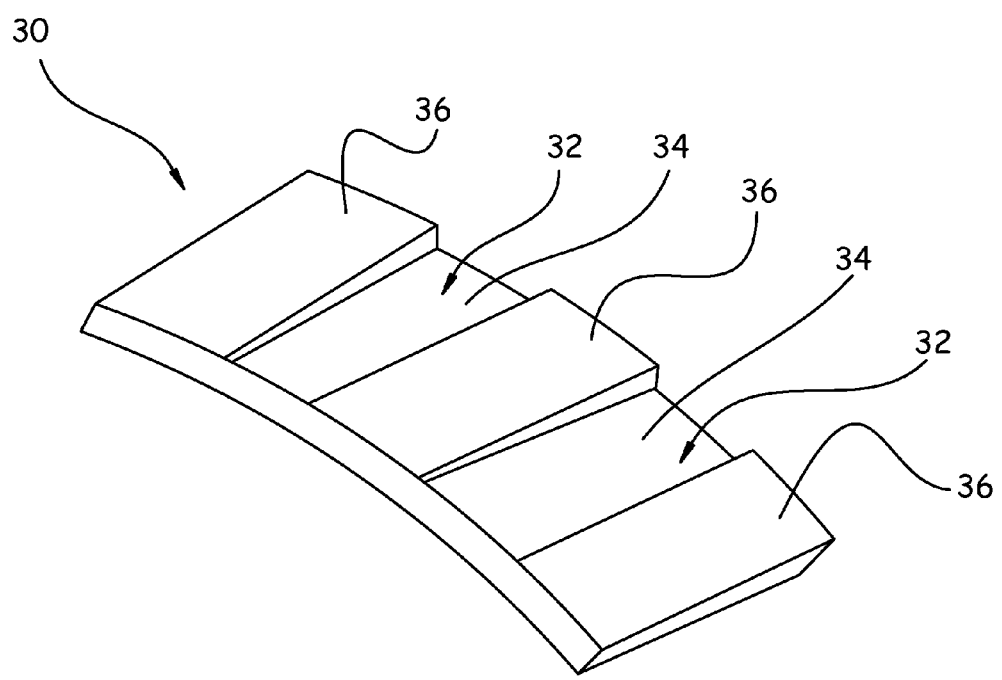

Other characteristics and advantages will emerge from the following description of the invention, a description that is provided only by way of example, relative to the accompanying drawings in which:

FIG. 1 is a perspective view of an aircraft nacelle,

FIG. 2A is a side view of an aircraft nacelle when the thrust of the power plant does not exceed a certain threshold, FIG. 2B is a side view of an aircraft nacelle when the thrust of the power plant exceeds a certain threshold, FIG. 3 is a transverse cutaway view of the upper portion of the nacelle at the junction of said nacelle and the mast, FIG. 4A is a cutaway along line AA of FIG. 3 illustrating different positions of the fairing relative to the outside wall of the nacelle, FIG. 4B is a cutaway along line BB of FIG. 3 illustrating different positions of the fairing relative to the outside wall of the nacelle, and FIG. 5 is a cutaway of the portion of the nacelle that can be covered or exposed by the fairing.

DETAILED DESCRIPTION OF THE INVENTION

FIG. 1 shows an aircraft propulsion system that comprises a nacelle 10 in which a power plant 12, connected by connecting means to a mast 14 that is itself connected to the rest of the aircraft, is arranged in an essentially concentric manner. The longitudinal axis of the nacelle is referenced at 16.

The nacelle 10 comprises an inside wall 18 that delimits a pipe with an air intake at the front, whereby a first portion of the incoming air stream, called the primary stream, passes through the power plant to take part in the combustion process, with the second portion of the air stream, called the secondary stream, being entrained by a fan and flowing into an annular pipe that is delimited by the inside wall of the nacelle and the outside wall of the power plant.

The power plant 12 produces a thrust that is embodied by the arrows 20 on FIG. 2B.

The nacelle 10 also comprises an outside wall 22 with essentially circular cross-sections, which extends from the air intake to the aft exhaust, consisting of the juxtaposition of several elements.

At the front of the junction zone with the nacelle, the mast 14 comprises an aerodynamic surface that is called a fairing 24 that has as its function to limit the drag at the junction of the nacelle and the mast.

This fairing 24 has a complex, convex shape, with a lower edge 26 that adjoins the outside surface of the nacelle.

The connecting means between the nacelle and the mast are such that under the aerodynamic loads during flight, in particular because of the thrust 20, the nacelle 10 moves slightly relative to the mast and therefore relative to the fairing 24, in particular along the longitudinal axis 16 of the nacelle.

FIG. 2A shows a first position called a rear position of the nacelle relative to the mast when the thrust does not exceed a certain threshold.

FIG. 2B shows a second position called a front position of the nacelle relative to the mast during a maximum aerodynamic load. FIG. 2B exaggerates this movement so as to better illustrate the invention. The actual movement is on the order of +/−10 mm relative to the position of the air intake upon shutdown.

According to the aerodynamic load, the nacelle can occupy intermediate positions between the rear position and the front position.

During this front-to-rear movement, the lower edge 26 of the fairing moves relative to the outside wall of the nacelle, and the fairing 24 covers or exposes a so-called overlapping zone 28 based on the position of the nacelle relative to said fairing, which can be seen in FIG. 2B.

The nacelle 10 also comprises at least one air system, in particular for ensuring the heating, cooling or ventilation, comprising a circuit that extends from at least one air intake up to at least one air exhaust by passing through at least one exchanger or any other device that requires air or that operates with air.

According to the invention, at least one air intake 30 is provided at the overlapping zone 28 that can be covered and exposed by the fairing 24.

Thus, according to the invention, the air intake 30 empties at the outside wall of the nacelle at the overlapping zone 28. In this way, this air intake is in the pass-through or closed state based on the position of the nacelle relative to the fairing.

When the nacelle is in the front position, the fairing does not cover the overlapping zone 28 and releases the air intake 30 so that the air penetrates the air system.

When the nacelle is in the rear position, the fairing covers the overlapping zone 28 and blocks the air intake 30 so that the air does not penetrate the air system. Thus, the air intake is in the deactivated state when the nacelle is in the rear position, namely when the thrust that is produced by the power plant does not exceed a certain threshold.

The opening of the air intake (and therefore the incoming flow) is modulated based on the relative position between the nacelle and the air intake.

Thus, upon shutdown, the air intake 30 is closed. This position is used as reference.

During take-off, because of the strong thrust of the engine, the nacelle moves by 10 mm toward the front relative to the fairing and allows a significant air flow into the air intake, which corresponds to the maximum requirement for cooling.

During cruising, the thrust of the engine is relatively weak relative to the take-off, and the nacelle moves slightly, on the order of 3 mm, toward the front relative to the fairing. Thus, the air flow that penetrates into the air intake is less significant than at the moment of take-off. However, this flow is adapted to the engine requirement during this phase of the flight. In addition, with the air intake 30 being slightly open, its impact on the drag is limited.

Upon landing, during the use of thrust reversal systems, the movement of the nacelle is 10 mm toward the rear, which does not have any impact on the air intake.

Thus, according to the invention, the air intake 30 is more or less blocked by the fairing based on the flight phase so that its opening or its flow rate is adapted to the flight phase and corresponds to the engine requirements.

This type of air intake can replace existing scoops.

Preferably, an air intake according to the invention comes in addition to the other air intakes in the form of a scoop so that it is possible to reduce the dimensions of said air intakes and consequently their influence on the aerodynamics.

In FIGS. 4A and 4B, the fairing is shown in solid lines when the nacelle is in the front position and the air intake is in the deactivated state, and the fairing is shown in dotted lines when the nacelle is in an intermediate position and when it is in the rear position and the air intake is in the activated state.

According to one embodiment, an air intake 30 comprises at least one groove 32 that is provided at the outside surface that extends in the longitudinal direction in the overlapping zone 28. Preferably, this groove 32 has a U-shaped cross-section with a bottom 34 and support surfaces 36 on either side.

Advantageously, the depth of the groove 32, namely the distance that separates the bottom 34 from the support surfaces 36, increases from the front to the rear.

Thus, the passage cross-section (corresponding to the U-shaped cross-section of the groove) increases from front to rear. Thus, the passage cross-section of the air intake increases based on the position of the nacelle relative to the mast.

Preferably, the air intake 30 comprises two grooves 32 that are arranged in a symmetrical manner relative to the vertical median plane of the nacelle. The fact of arranging grooves in a symmetrical manner relative to the median axis makes possible a better distribution of the forces.

The support surface 36 between the two grooves 32 makes it possible to limit the deformations of the fairing.

According to one embodiment, the air intake comes in the form of a ring portion that is arranged at the outside surface of the nacelle to the right of the overlapping zone. In a plane that contains the longitudinal axis, this ring has a cross-section in the shape of a right triangle whose hypotenuse is oriented toward the mast, and the long side is arranged essentially parallel to the longitudinal axis of the nacelle.

The invention claimed is:

1. An aircraft propulsion system that comprises:
   a nacelle comprising an outside wall and at least one air system with at least one air intake;
   a power plant arranged in the nacelle;
   a mast that is connected to the aircraft, the power plant being connected to said mast;
   said mast comprising a front part with an aerodynamic surface, said aerodynamic surface is a fairing that comprises a lower edge that adjoins the outside wall of the nacelle;
   said nacelle being movable in a longitudinal direction of the nacelle relative to the mast between a rear position and a front position according to an aerodynamic load produced by the power plant,
   a zone of the outside wall that is an overlapping zone being covered by the fairing when the nacelle is in a rear position and being not covered by the fairing when the nacelle is in a front position, the at least one air intake for an air system arranged at said overlapping zone.

2. The aircraft propulsion system according to claim 1, wherein the at least one air intake comprises at least one groove that is provided at the outside surface that extends in the longitudinal direction in the overlapping zone.

3. The aircraft propulsion system according to claim 2, wherein the groove has a U-shaped cross-section with a bottom and support surfaces on either side.

4. The aircraft propulsion system according to claim 2, wherein a depth of the groove increases from front to the rear.

5. The aircraft propulsion system according to claim 1, wherein the at least one air intake comprises grooves that are arranged in a symmetrical manner relative to the vertical median plane of the nacelle.

6. The aircraft propulsion system according to claim 1, wherein the at least one air intake comprises a ring portion that is arranged at the outside surface of the nacelle to the right of the overlapping zone with a triangle-shaped cross-section.

7. The aircraft propulsion system according to claim 1, wherein the at least one air intake configured to be blocked by the fairing based on the flight phase.

8. The aircraft propulsion system according to claim 1, wherein during takeoff the nacelle is configured to move forward relative to the fairing.

9. The aircraft propulsion system according to claim 1, wherein during cruising the nacelle is configured to move forward relative to the fairing.

10. The aircraft propulsion system according to claim 1, wherein during landing the nacelle is configured to move rearward relative to the fairing.

11. The aircraft propulsion system according to claim 1, wherein during takeoff the nacelle is configured to move forward 10 mm relative to the fairing.

12. The aircraft propulsion system according to claim 1, wherein during cruising the nacelle is configured to move forward 3 mm relative to the fairing.

13. The aircraft propulsion system according to claim 1, wherein during landing the nacelle is configured to move rearward 10 mm relative to the fairing.

14. The aircraft propulsion system according to claim 1, wherein nacelle has a front position and a rear position relative to the mast, and the nacelle is configured to move +/− 10 mm relative to a position of the air intake upon shutdown.

* * * * *